United States Patent [19]

Takanashi

[11] Patent Number: 4,859,011
[45] Date of Patent: Aug. 22, 1989

[54] LIGHT SCANNING DEVICE
[75] Inventor: Kenichi Takanashi, Yokohama, Japan
[73] Assignee: Ricoh Company, Ltd., Tokyo, Japan
[21] Appl. No.: 207,719
[22] Filed: Jun. 16, 1988
[30] Foreign Application Priority Data Jun. 17, 1987 [JP] Japan ................................ 62-150983
Jun. 7, 1988 [JP] Japan ................................ 63-140044

[51] Int. Cl.$^4$ ............................................. G02B 26/10
[52] U.S. Cl. .................................................... 350/6.8
[58] Field of Search .................... 350/6.5, 6.6, 6.7, 6.8

[56] References Cited
U.S. PATENT DOCUMENTS 4,269,478  5/1981  Maeda et al. ......................... 350/6.8
4,707,085  11/1987  Takanashi et al. .................... 350/6.8
4,712,884  12/1987  Sakuma et al. ........................ 350/6.8
4,756,583  7/1988  Morimoto ............................. 350/6.8
4,756,584  7/1988  Takanashi ............................. 350/6.8
4,770,517  9/1988  Sakuma ................................ 350/6.8

FOREIGN PATENT DOCUMENTS 147316 6/1984 Japan .

Primary Examiner—Bruce Y. Arnold
Assistant Examiner—Loha Ben
Attorney, Agent, or Firm—Oblon, Spivak, McClelland, Maier & Neustadt

[57] ABSTRACT

A light scanning device includes a light source unit, a first focusing optical system for focusing a light beam from the light source unit as a linear image in a position, a rotating polygon having a reflecting surface near the position for deflecting the light beam at a constant angular velocity, and a second focusing optical system for focusing the light beam deflected by the rotating polygon as a spot on a surface being scanned. The second focusing optical system includes a lens having a toric surface and coupling the reflecting surface and the scanned surface in substantially conjugate relationship with respect to an auxiliary scanning direction. The axis of the deflected light beam and the optical axis of the second focusing optical system deviate by $\Delta$ from each other in a light deflecting plane, where the deflected light beam is parallel to the optical axis of the second focusing optical system, with the second focusing optical system having a focal length fM in the light deflecting plane, the amount of deviation $\Delta$ being in the range: $0.0066\ fM < \Delta < 0.0076\ fM$.

7 Claims, 8 Drawing Sheets

(III)

CURVATURE OF FIELD

LIGHT SCANNING DEVICE

BACKGROUND OF THE INVENTION

The present invention relates to a light scanning device.

Light scanning devices are known as a device for writing and reading information by scanning a light beam. In one type of such a light scanning device, a light beam emitted from a light source is focused as a linear image, and a rotating polygon mirror has a reflecting surface positioned near the linearly focused image for deflecting the light beam at a constant angular velocity. The deflected light beam is focused as a beam spot on a surface by a focusing lens system for scanning the surface.

Figure 2:
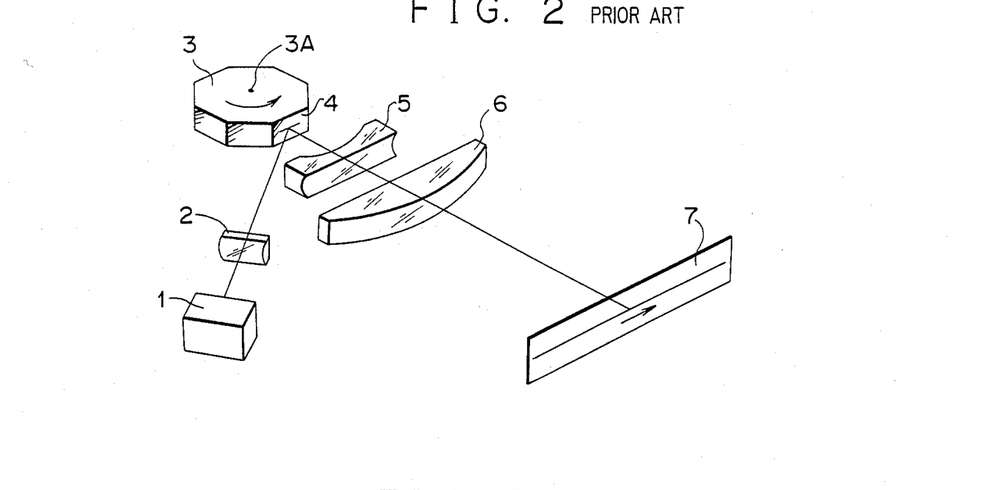
FIGS. 2 through 6 are diagrams explaining a conventional light scanning device and its problems.

FIG. 2 of the accompanying drawings illustrates a conventional light scanning device of the type described. A light beam emitted from a light source 1 is focused as a linear image near a reflecting surface 4 of a rotating polygon mirror 3 by a first focusing optical system 2. The light beam reflected by the rotating polygon mirror 3 is deflected at a constant angular velocity upon rotation of the rotating polygon mirror 3. The deflected light beam is then focused as a beam spot on a surface 7 by a second focusing optical system comprising lenses 5, 6 for scanning the surface 7.

Figure 3:
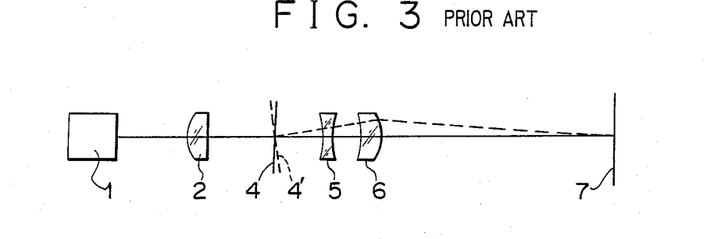
Figure 4:
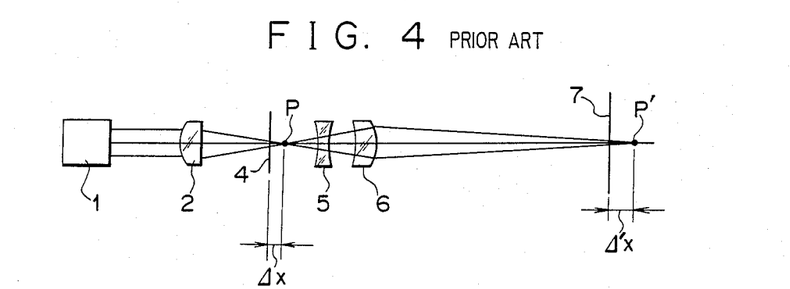

The light scanning device employing a rotating multifaceted polygon, however, suffers from the problem of a facet error. That is, the mirror facets of the polygon may not lie parallel to the axis of rotation of the polygon mirror. One known method of solving this problem is to use an anamorphic optical system as the second focusing optical system disposed between the rotating polygon and the surface to be scanned, and to position the reflecting position on the rotating polygon and the scanning surface in conjugate relationship with respect to an auxiliary scanning direction (vertical direction in FIG. 3). In FIG. 3, the second focusing optical system couples the reflecting position on the rotating polygon 3 and the scanned surface 7 in substantilly conjugate relationship as viewed in the auxiliary scanning direction. Therefore, even if a mirror facet 4 of the rotating polygon suffers from a deviant orientation as represented by 4', the focused position on the scanned surface 7 is not virtually moved in the auxiliary scanning direction by the second focusing optical system. The facet error is corrected in this manner.

When the polygon mirror 3 rotates, the reflecting surface or facet 4 rotates about an axis 3A, and there is developed an optical path length change (sag) between the first focusing optical system 2 and the reflecting surface 4. Therefore, a positional deviation ΔX is produced between the position P of the focused linear image and the reflecting surface 4, and hence the position P' of a conjugate image of the linear image generated by the second focusing optical system or fθ lens system is deviated from the scanned surface 7 by Δ'X.

Figure 5:
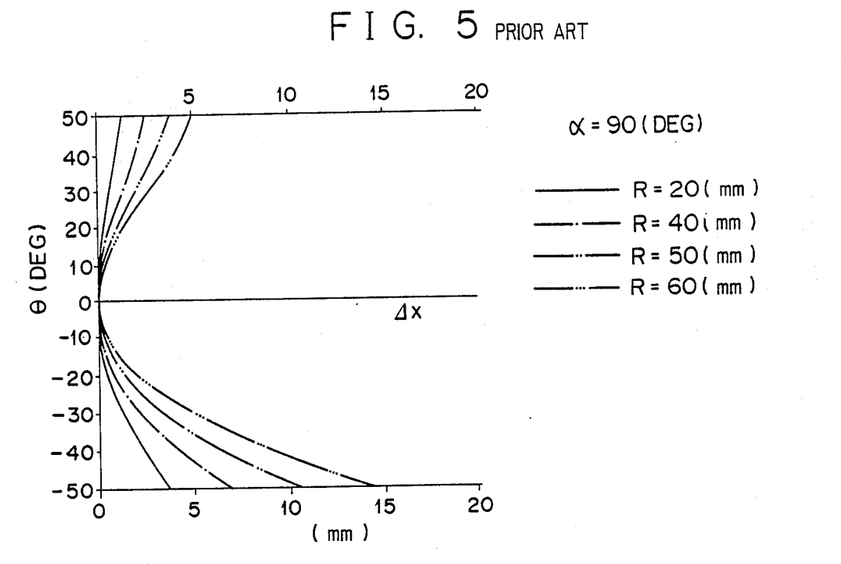
Figure 6:
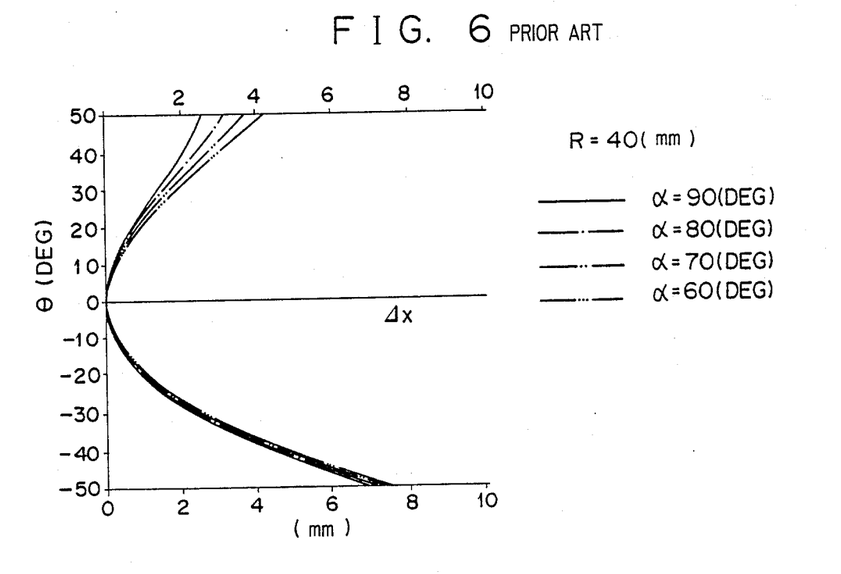
Figure 7:
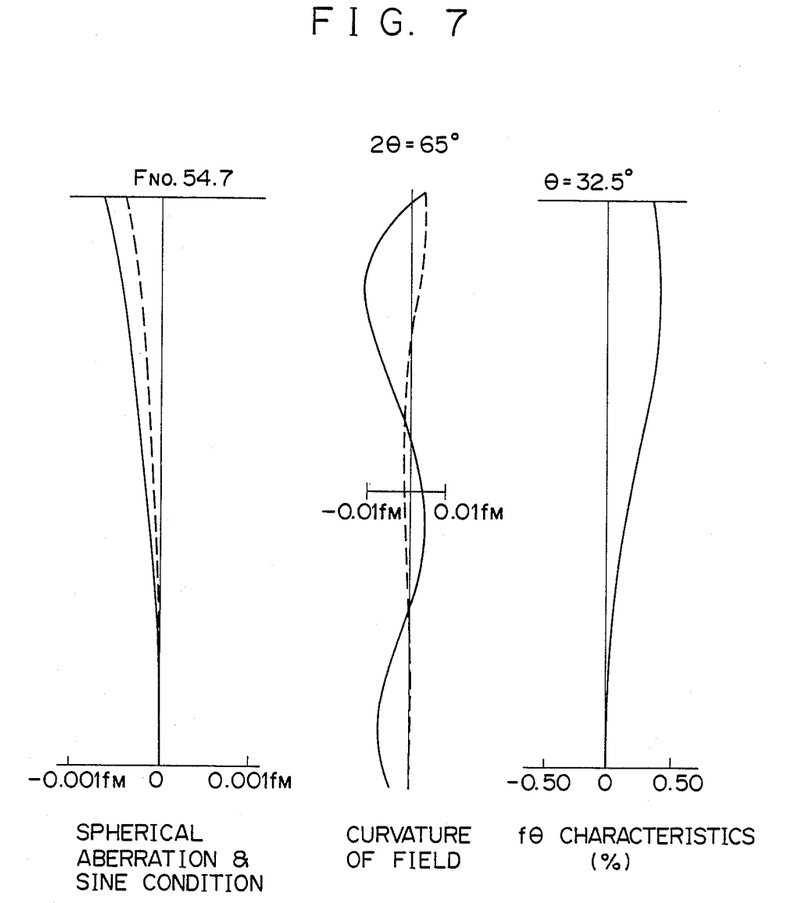
FIGS. 7 through 10 are diagrams showing aberrations.
Figure 8:
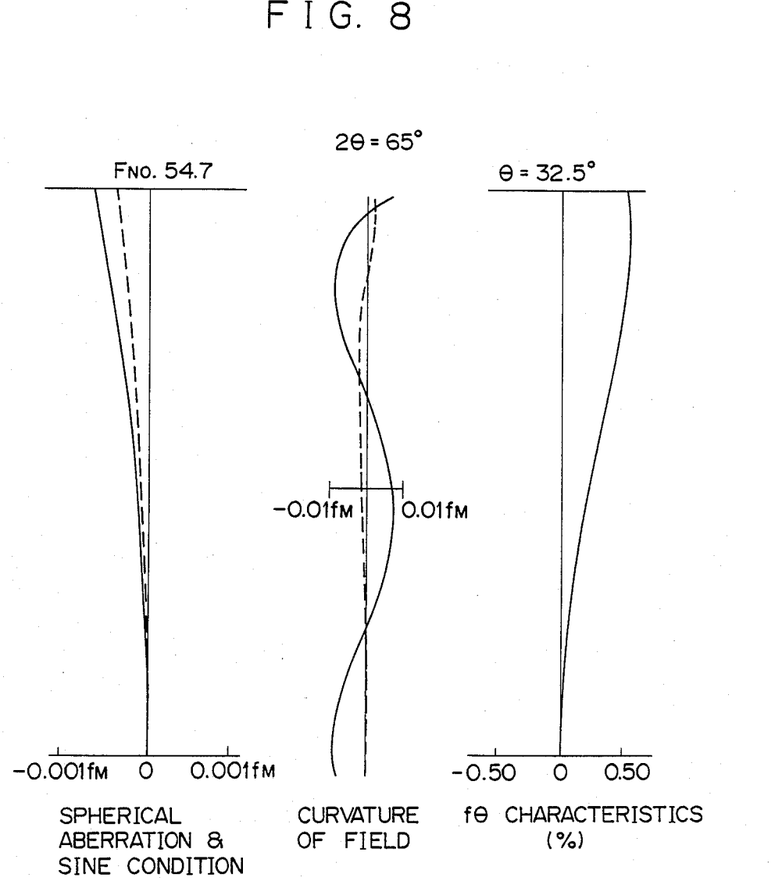
Figure 9:
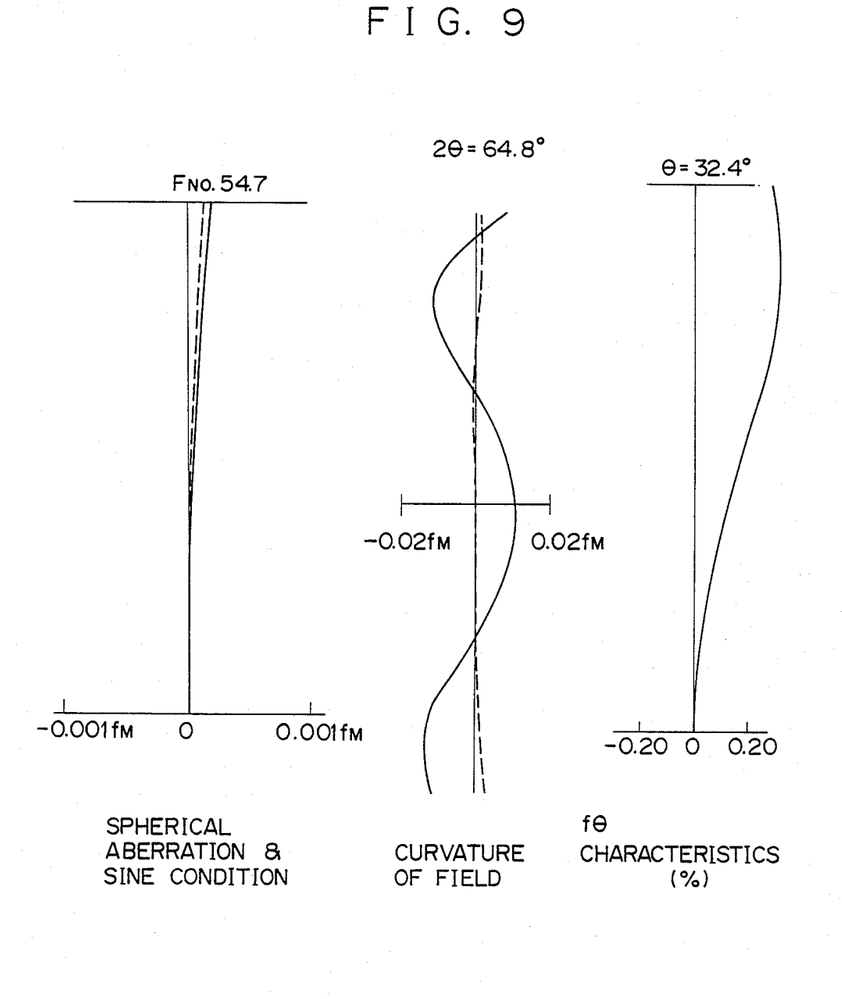
Figure 10:
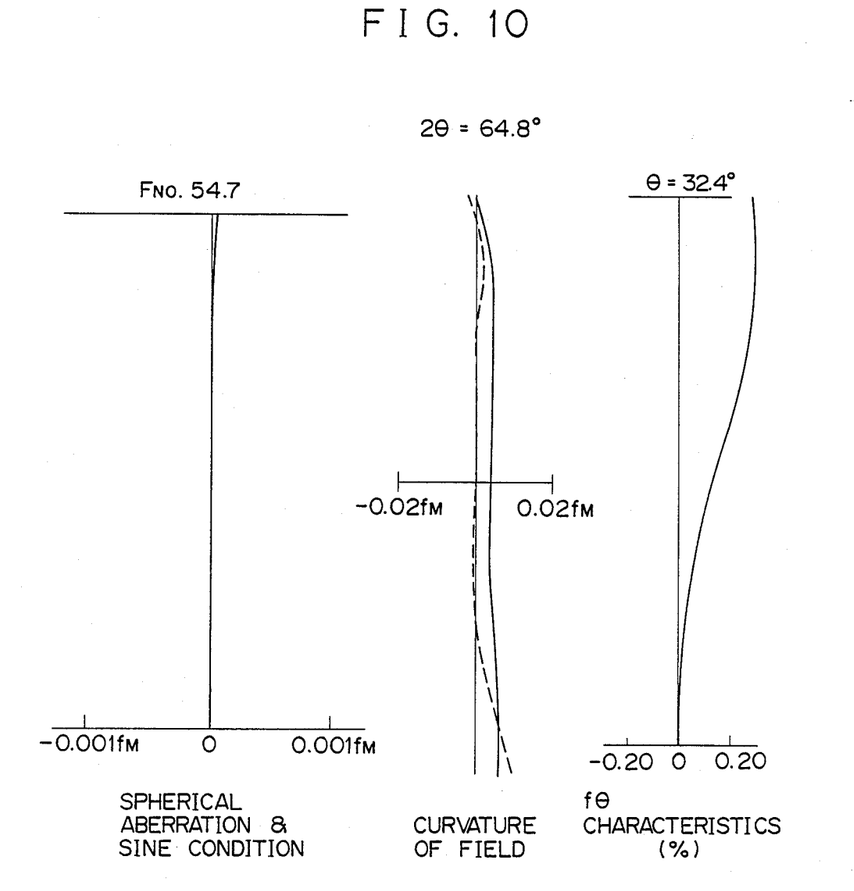

The amount of deviation Δ'X is given as $\Delta'X = \beta^2 \cdot \Delta X$ where $\beta$ is the lateral magnification of the lens system, as is well known.

Where the angle formed in the light deflecting plane between the optical axis of the lenses and the principal ray of the deflected light beam is expressed by $\theta$, the relationship between $\theta$ and ΔX is shown in FIGS. 5 and 6.

The curves in FIG. 5 are plotted with an angle $\alpha$ (which is the angle between the principal ray of the light beam applied to the rotating polygon and the optical axis of the second focusing optical system) being 90° and the radius R of a circle inscribed in the rotating polygon 3 being used as a parameter. In FIG. 6, the curves are plotted with the radius R of the inscribed circle being 40 mm and the angle $\alpha$ being used as a parameter.

As can be seen from FIGS. 5 and 6, ΔX is greater as the radius R of the inscribed circle is greater and the angle $\alpha$ is smaller.

The relative positional deviation between the linear image and the reflecting surface upon rotation of the reflecting surface is developed two-dimensionally in the light deflecting plane and is asymmetrically moved with respect to the lens optical axis.

Therefore, with the light scanning device as shown in FIG. 2, it is necessary that the curvature of field in each of the main and auxiliary scanning directions of the second focusing optical system be well corrected. As described above, the positional deviation ΔX is produced by the sag. Since the configuration of a rotating polygon, or optimum conditions thereof, i.e., the number of reflecting surfaces or facets and the position of the axis of rotation thereof, are determined by the radius of a light beam applied and the angle of incidence to the second focusing optical system, the sag is also determined as one of the characteristics of the rotating polygon. Japanese Laid-Open Patent Publication No. 59-147316 discloses a known light scanning device of the kind described above. However, the problem of curvature of field developed by sag has not sufficiently been studied in the disclosed light scanning device.

SUMMARY OF THE INVENTION

In view of the aforesaid problems of the conventional light scanning devices, it is an object of the present invention to provide a light scanning device which is capable of well correcting the problem of a facet error of a rotating polygon and the problem of curvature of field in each of main and auxiliary scanning directions, and is capable of producing a focused beam image of a highly reduced width and hence a high-density beam spot diameter.

A light scanning device according to the present invention has a light source, a first focusing optical system for focusing a light beam from the light source as a linear image in a position, a rotating polygon having a reflecting surface near the position for deflecting the light beam at a constant angular velocity, and a second focusing optical system for focusing the light beam deflected by the rotating polygon as a spot on a surface being scanned.

The second focusing optical system includes a lens having a toric surface and coupling the reflecting surface and the scanned surface in substantially conjugate relationship with respect to an auxiliary scanning direction.

Where the bisector of the sweeping angle (=2θ max) of the deflected light beam is parallel to the optical axis of the second focusing optical system, and when the axis of the deflected light beam and the optical axis of the second focusing optical system deviate by Δ from each other in a light deflecting plane, with the second focusing optical system having a focal length fM in the light deflecting plane, the amount of deviation Δ is in the range:

$0.0066fM < \Delta < 0.0076fM$.

The first focusing optical system comprises at least one cylindrical lens.

The condition: $0.0066fM < \Delta < 0.0076fM$ serves to compensate for the curvature of field. If the upper and lower limits of this range were exceeded, the width or interval of the curvature of field would greatly be reduced.

With the above arrangement, the curvature of field of the light scanning device is reduced in both main and auxiliary scanning directions, so that a high-density light beam spot with small spot diameter variations can be produced. Since the light scanning device can well correct a facet error and does not employ an elongate cylindrical lens, it is compact in size and low in cost.

The aove and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
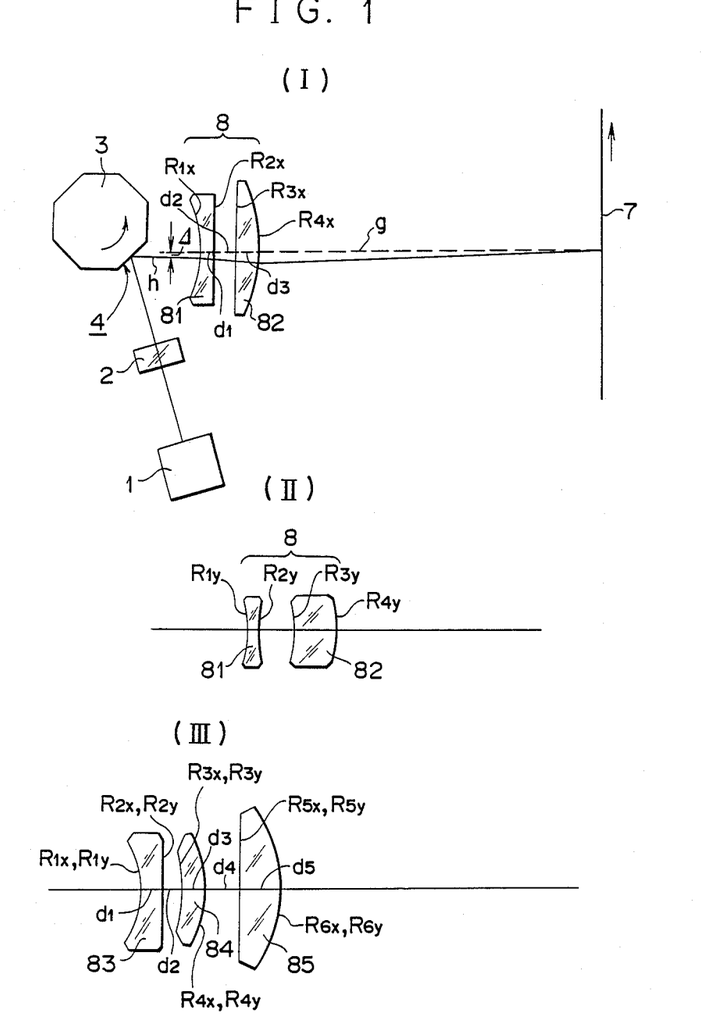
FIG. 1 is a schematic plan view of a light scanning device according to the present invention.

FIG. 1(I) shows a light scanning device according to an embodiment of the present invention.

The light scanning device shown in FIG. 1(I) includes a rotating polygon 3 for deflecting a light beam to cause its axis to sweep a light deflecting plane. The light scanning device of FIG. 1(I) is viewed in an auxiliary scanning direction, i.e., a direction normal to the light deflecting plane.

The light scanning device includes a light source unit 1 comprising either a light source for emitting a parallel-ray light beam or a light source for emitting a divergent light beam and a condensing element for converging the divergent light beam into a parallel-ray light beam. The parallel-ray light beam from the light source unit 1 is focused by a first focusing optical system 2 comprising a cylindrical lens, as a linear image near a reflecting surface 4 of the rotating polygon 3.

The light beam reflected by the rotating polygon 3 is focused by a second focusing optical system 8 as a spot image on a surface 7, which is scanned at a constant speed by the light beam spot upon constant-speed rotation of the rotating polygon 3 in the direction of the arrow.

The second focusing optical system 8 comprises a first lens 81 positioned closer to the rotating polygon 3 and a second lens 82 positioned closer to the scanned surface 7. The second focusing optical system has a so-called fθ function. As viewed within the light deflecting plane, the lens system composed of the lenses 81, 82 couples the infinity at the light source unit and the scanned surface 7 in conjugate relationship. As viewed within a plane normal to the light deflecting plane, the same lens system couples the reflecting position on the rotating polygon 3 and the scanned surface 7 in substantially connjugate relationship. Therefore, even if the rotating polygon 3 has a facet error as explained with reference to FIG. 3, the position where the light beam is focused on the scanned surface 7 by the second focusing optical system 8 is not substantially moved in the auxiliary scanning direction. Accordingly, the problem of a facet error is corrected.

The second focusing optical system 8 has an optical axis g extending perpendicularly to the scanned surface 7. In a region where the axis h of the light beam deflected by the rotating polygon 3 is parallel to the optical axis g, as shown in FIG. 1(I), the axes g, h deviate by $\Delta$ from each other within the light deflecting plane. The principal ray h and the axis of the second focusing optical system are in the same tangential plane. The amount of deviation $\Delta$ is selected to meet the range or condition:

$0.0066fM < \Delta < 0.0076fM$ where fM is the combined focal length of the second focusing optical system 8 within the light deflecting plane.

Four specific examples of the second focusing optical system 8 according to the present invention will hereinafter be described.

In each of the four examples, fM represents the combined focal length of the second focusing optical system within the light deflecting plane, fM being selected as fixed value of 100, fS the combined focal length of the second focusing optical system in a plane normal to the light deflecting plane or in the auxiliary scanning direction, $\theta$ a light deflecting angle, $\alpha$ an angle as defined above, R the radius of a circle inscribed in the rotating polygon, Fno the brightness, Rix the radius of curvature in the light deflecting plane of the ith lens surface as counted from the rotating polygon, Riy the radius of curvature in a plane normal to the light deflecting plane of the ith lens surface, di the ith distance beteen lens surfaces, and ni the refractive index of the ith lens with respect to light having a wavelength of 780 nm.

In each of examples 1 and 2, given below, the second focusing optical system comprises two lenses as shown in FIGS. 1(I) and 1(II). Each of first and second lenses 81, 82 of the second focusing optical systems shown in FIGS. 1(I) and 1(II) is in the form of a single anamorphic lens. The lens 81 has a first spherical surface (on which a light beam falls) and a second cylindrical surface. The first lens 81 is a plano-concave lens in the light deflecting plane, and a double concave lens in a plane normal to the light deflecting plane. The second lens 82 has a first cylindrical surface and a second toric surface. The second lens 82 is a plano-convex lens in the light deflecting plane and a meniscus-convex lens in a plane normal to the light deflecting plane.

EXAMPLE 1

$fM = 100$, $fS = 22.135$, $2\theta = 65°$, $\alpha = 60°$, $R/fM = 0.151$, $Fno = 54.7$, $\Delta/fM = 0.00758$

| i | Rix | Riy | di | ni |
|---|---|---|---|---|
| 1 | −107.774 | −107.774 | 5.672 | 1.71221 |
| 2 | ∞ | 58.623 | 10.966 | 1.675 |
| 3 | ∞ | −58.623 | 6.807 | |
| 4 | −45.569 | −11.728 | | |

EXAMPLE 2

| fM = 100, fS = 20.576, 2θ = 65°, α = 60°, R/fM = 0.132, Fno = 54.7, Δ/fM = 0.00756 | | | |
|---|---|---|---|
| i | Rix | Riy | di | ni |
| 1 | −71.849 | −71.849 | 7.185 | 1.60909 |
| 2 | ∞ | 55.4 | 7.185 | 1.76605 |
| 3 | ∞ | −55.4 | 7.185 | |
| 4 | −46.983 | −11.995 | | |

In each of examples 3 and 4, given below, the second focusing optical system comprises three lenses as shown in FIG. 1(III). A first lens 83 is a spherical meniscus concave lens, a second lens 84 is a spherical meniscus convex lens, and a third lens 85 is a lens having a cylindrical surface and a toric surface.

EXAMPLE 3

| fM = 100, fS = 20.862, 2θ = 64.8°, α = 60°, R/fM = 0.132, Fno = 54.7, Δ/fM = 0.00662 | | | |
|---|---|---|---|
| i | Rix | Riy | di | ni |
| 1 | −20.775 | −20.775 | 2.27 | 1.51118 |
| 2 | −192.913 | −192.913 | 2.01 | 1.51118 |
| 3 | −70.366 | −70.366 | 4.16 | 1.76605 |
| 4 | −27.986 | −27.986 | 0.83 | |
| 5 | ∞ | −53.233 | 5.3 | |
| 6 | −49.507 | −13.014 | | |

EXAMPLE 4

| fM = 100, fS = 30.518, 2θ = 64.8°, α = 60°, R/fM = 0.303, Fno = 54.7, Δ/fM = 0.00681 | | | |
|---|---|---|---|
| i | Rix | Riy | di | ni |
| 1 | −21.653 | −21.653 | 2.27 | 1.51118 |
| 2 | −181.845 | −181.845 | 2.01 | 1.51118 |
| 3 | −88.977 | −88.977 | 6.81 | 1.76605 |
| 4 | −28.974 | −28.974 | 0.83 | |
| 5 | ∞ | −153.688 | 9.08 | |
| 6 | −59.957 | −21.564 | | |

FIGS. 7 through 10 show aberrations of the examples 1 through 4, respectively. In each of FIGS. 7 through 10, the spherical aberration and the sine condition are indicated by solid and broken lines, respectively. The solid-line curve of curvature of field indicates a focused position in the auxiliary scanning direction, whereas the broken-line curve in the main scanning direction indicates a focused position in the main scanning direction. The curvature of field is shown in an entire deflecting area since it is asymmetric due to sag. The fθ characteristic is a quality which is defined by $$\{(h' - f\cdot\theta)/(f\cdot\theta)\} \times 100\%$$

where f·θ is the ideal image height and h' is the actual image height.

Figure 11:
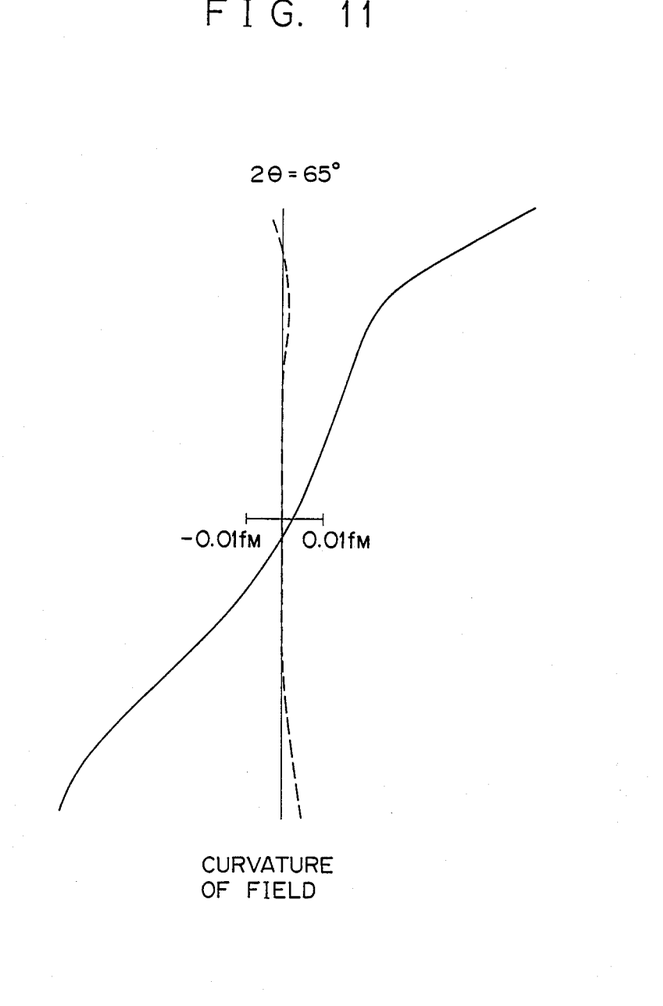
FIG. 11 is a diagram showing the curvature of field of a light scanning device according to an example of the invention.

The curvature of field of the second focusing optical system which is the same as the example 1 with Δ=0 is illustrated in FIG. 11. The advantages of the present invention will easily be understood from comparison of FIG. 11 and the curvature of field of the example 1 shown in FIG. 7.

Although a certain preferred embodiment has been shown and described, it should be understood that many changes and modifications may be made therein without departing from the scope of the appended claims.

What is claimed is:

1. A light scanning device comprising:
   a light source unit;
   a first focusing optical system for focusing a light beam from said light source unit as a linear image in a position;
   a rotating polygon having a reflecting surface near said position for deflecting the light beam at a constant angular velocity;
   a second focusing optical system for focusing the light beam deflected by said rotating polygon as a spot on a surface being scanned;
   said second focusing optical system including a lens having a toric surface and coupling the reflecting surface and the scanned surface in substantially conjugate relationship with respect to an auxiliary scanning direction; and
   the axis of the deflected light beam and the optical axis of the second focusing optical system deviating by Δ from each other in a light deflecting plane, where the deflected light beam is parallel to the optical axis of the second focusing optical system, with the second focusing optical system having a focal length fM in the light deflecting plane, the amount of deviation Δ being in the range:

0.0066fM < Δ < 0.0076fM.

2. A light scanning device according to claim 1, wherein said second focusing optical system comprises first and second lenses each in the form of a single anamorphic lens, said first lens having a first spherical surface and a second cylindrical surface, and being a plano-concave lens within the light deflecting plane and a double concave lens in a plane normal to the light deflecting plane, said second lens having a first cylindrical surface and a second toric surface, and being a plano-convex lens in the light deflecting plane and a meniscus convex lens in the plane normal to the light deflecting plane.

3. A light scanning device according to claim 2, wherein said second focusing optical system has the following values:

| fM = 100, fS = 22.135, 2θ = 65°, α = 60°, R/fM = 0.151, Fno = 54.7, Δ/fM = 0.00758 | | | |
|---|---|---|---|
| i | Rix | Riy | di | ni |
| 1 | −107.774 | −107.774 | 5.672 | 1.71221 |
| 2 | ∞ | 58.623 | 10.966 | 1.675 |
| 3 | ∞ | −58.623 | 6.807 | |
| 4 | −45.569 | −11.728 | | | where fM represents the combined focal length of the second focusing optical system within the light deflecting plane, fM being selected as fixed value of 100, fS the combined focal length of the second focusing optical system in the plane normal to the light deflecting plane, θ a light deflecting angle, α an angle formed between the principal ray of the light beam applied to the rotating polygon and the optical axis of the second focusing optical system, R the radius of a circle inscribed in the rotating polygon, Fno the brightness, Rix the radius of curvature in the light deflecting plane of the ith lens surface as counted from the rotating polygon, Riy the radius of curvature in a plane normal to the light deflecting plane of the ith lens surface, di the ith distance between lens surfaces, and ni the refractive index of the ith lens with respect to light having a wavelength of 780 nm.

4. A light scanning device according to claim 2, wherein said second focusing optical system has the following values:

$fM = 100$, $fS = 20.576$, $2\theta = 65°$, $\alpha = 60°$, $R/fM = 0.132$, $Fno = 54.7$, $\Delta/fM = 0.00756$

| i | Rix | Riy | di | ni |
|---|-----|-----|-----|-----|
| 1 | −71.849 | −71.849 | 7.185 | 1.60909 |
| 2 | ∞ | 55.4 | 7.185 | 1.76605 |
| 3 | ∞ | −55.4 | 7.185 | |
| 4 | −46.983 | −11.995 | | | where fM represents the combined focal length of the second focusing optical system within the light deflecting plane, fM being selected as fixed value of 100, fS the combined focal length of the second focusing optical system in the plane normal to the light deflecting plane, $\theta$ a light deflecting angle, $\alpha$ an angle formed between the principal ray of the light beam applied to the rotating polygon and the optical axis of the second focusing optical system, R the radius of a circle inscribed in the rotating polygon, Fno the brightness, Rix the radius of curvature in the light deflecting plane of the ith lens surface as counted from the rotating polygon, Riy the radius of curvature in a plane normal to the light deflecting plane of the ith lens surface, di the ith distance between lens surfaces, and ni the refractive index of the ith lens with respect to light having a wavelength of 780 nm.

5. A light scanning device according to claim 1, wherein said second focusing optical system comprises first, second, and third lenses, said first lens being a spherical meniscus concave lens, a second lens being a spherical meniscus convex lens, and a third lens being a lens having a cylindrical surface and a toric surface.

6. A light scanning device according to claim 5, wherein said second focusing optical system has the following values:

$fM = 100$, $fS = 20.862$, $2\theta = 64.8°$, $\alpha = 60°$, $R/fM = 0.132$, $Fno = 54.7$, $\Delta/fM = 0.00662$

| i | Rix | Riy | di | ni |
|---|-----|-----|-----|-----|
| 1 | −20.775 | −20.775 | 2.27 | 1.51118 |
| 2 | −192.913 | −192.913 | 2.01 | 1.51118 |
| 3 | −70.366 | −70.366 | 4.16 | 1.76605 |
| 4 | −27.986 | −27.986 | 0.83 | |
| 5 | ∞ | −53.233 | 5.3 | |
| 6 | −49.507 | −13.014 | | | where fM represents the combined focal length of the second focusing optical system within the light deflecting plane, fM being selected as fixed value of 100, fS the combined focal length of the second focusing optical system in a plane normal to the light deflecting plane, $\theta$ a light deflecting angle, $\alpha$ an angle formed between the principal ray of the light beam applied to the rotating polygon and the optical axis of the second focusing optical system, R the radius of a circle inscribed in the rotating polygon, Fno the brightness, Rix the radius of curvature in the light deflecting plane of the ith lens surface as counted from the rotating polygon, Riy the radius of curvature in a plane normal to the light deflecting plane of the ith lens surface, di the ith distance between lens surfaces, and ni the refractive index of the ith lens with respect to light having a wavelength of 780 nm.

7. A light scanning device according to claim 5, wherein said second focusing optical system has the following values:

$fM = 100$, $fS = 30.518$, $2\theta = 64.8°$, $\alpha = 60°$, $R/fM = 0.303$, $Fno = 54.7$, $\Delta/fM = 0.00681$

| i | Rix | Riy | di | ni |
|---|-----|-----|-----|-----|
| 1 | −21.653 | −21.653 | 2.27 | 1.51118 |
| 2 | −181.845 | −181.845 | 2.01 | 1.51118 |
| 3 | −88.977 | −88.977 | 6.81 | 1.76605 |
| 4 | −28.974 | −28.974 | 0.83 | |
| 5 | ∞ | −153.688 | 9.08 | |
| 6 | −59.957 | −21.564 | | | where fM represents the combined focal length of the second focusing optical system within the light deflecting plane, fM being selected as fixed value of 100, fS the combined focal length of the second focusing optical system in a plane normal to the light deflecting plane, $\theta$ a light deflecting angle, $\alpha$ an angle formed between the principal ray of the light beam applied to the rotating polygon and the optical axis of the second focusing optical system, R the radius of a circle inscribed in the rotating polygon, Fno the brightness, Rix the radius of curvature in the light deflecting plane of the ith lens surface as counted from the rotating polygon, Riy the radius of curvature in a plane normal to the light deflecting plane of the ith lens surface, di the ith distahnce between lens surfaces, and ni the refractive index of the ith lens with respect to light having a wavelength of 780 nm.

* * * * *